United States Patent

[11] 3,633,714

[72] Inventor Hermann Klaue
Tour d'Ivoire 24e, Montreaux, Switzerland
[21] Appl. No. 846,704
[22] Filed Aug. 1, 1969
[45] Patented Jan. 11, 1972
Continuation-in-part of application Ser. No. 831,305, June 9, 1969, now abandoned. This application Aug. 1, 1969, Ser. No. 846,704

[54] FULL DISC BRAKE WITH ROTATING BRAKE DISCS
2 Claims, 13 Drawing Figs.
[52] U.S. Cl. .................................................. 188/134, 188/161, 192/35
[51] Int. Cl. ..................................................... F16d 59/00
[50] Field of Search .......................................... 188/134, 136, 137, 161, 162, 106 F; 192/8 R, 35

[56] References Cited
UNITED STATES PATENTS
2,649,941 8/1953 Doebeli .......................... 192/35
2,801,719 8/1957 Clerk .............................. 188/162 X Primary Examiner—Duane A. Reger
Attorney—Larson, Taylor & Hinds ABSTRACT: A full disc brake assembly including a pair of full rotatable brake discs, nonrotatably mounted on a shaft and movable axially to engage a fixed encircling housing to brake the shaft upon relative rotational movement of an actuating disc located between the brake discs. Said relative movement can be caused manually or by fluid pressure or electromagnetic means or the like acting on the outer periphery of the actuating disc. The encircling housing can be formed in several parts of different materials and can include a cooling space which may be spiral in shape on each side of the housing. A hollow brake lever filled with said cooling fluid can be used to act against the actuating disc. The brake can be placed into the vehicle axle for better heat dissipation.

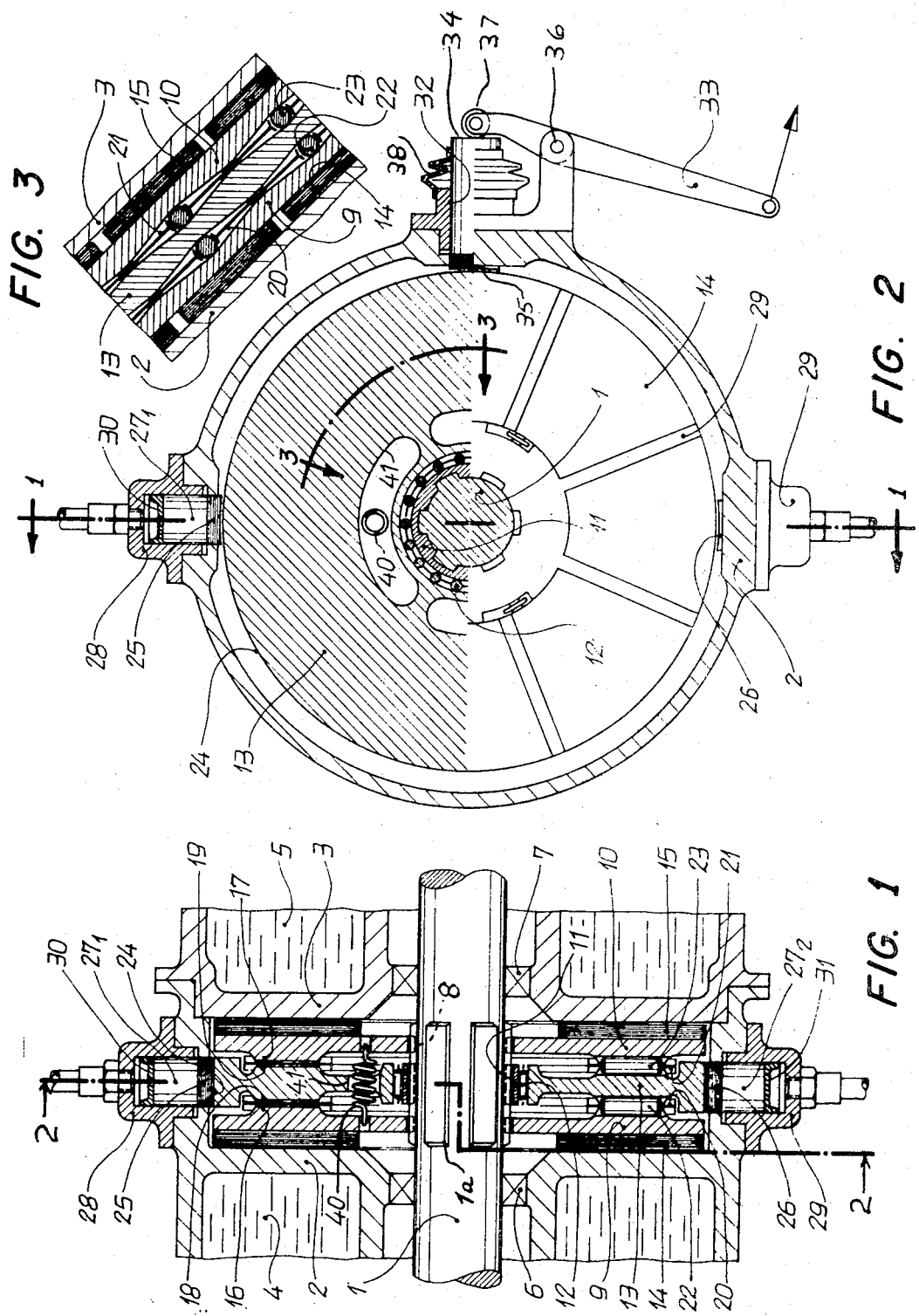

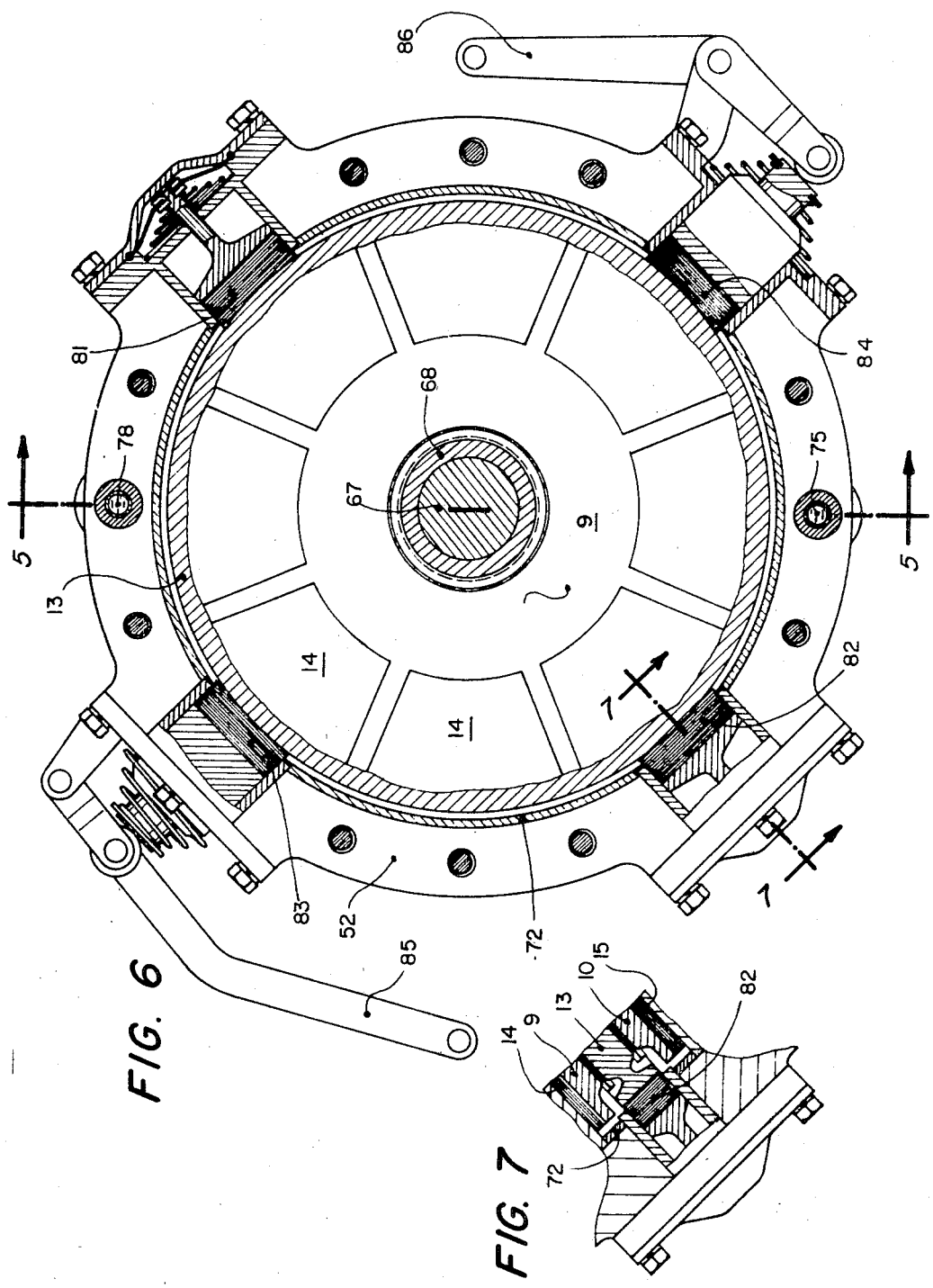

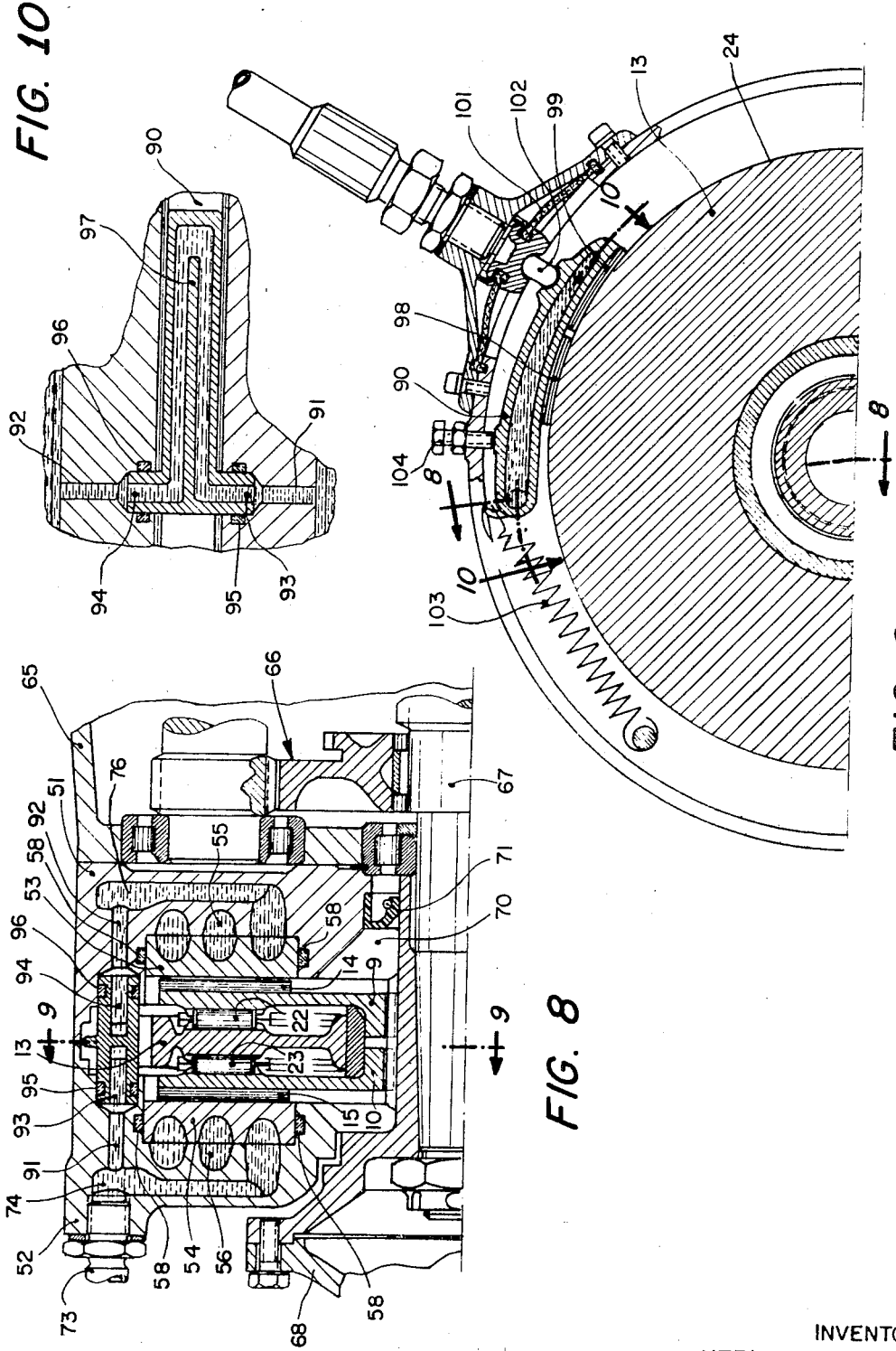

FULL DISC BRAKE WITH ROTATING BRAKE DISCS

This application is a continuation-in-part of application Ser. No. 831,305, filed June 9, 1969, now abandoned.

BACKGROUND OF THE INVENTION

This invention relates to disc brakes, and in particular it relates to full disc brakes of the type wherein the brake discs are mounted on the shaft to be braked, for rotation therewith.

Disc brake assemblies with rotating brake discs, are particularly advantageous for installation in an axle-tube, especially for tractors and vehicle gears and the like. In this environment, fixed parts of the axle or the gear box serve as the friction surfaces against which the brake discs act to cause braking of the shaft.

If is known to provide full disc brake assemblies having rotating brake discs mounted on the shaft to be braked. In one previous arrangement, friction linings are provided on both sides of each brake disc. The external friction linings frictionally engage a fixed housing part. The inwardly facing friction surfaces engage separate actuating discs, wherein the facing surfaces of the two actuating discs are formed with inclined surfaces, and wherein suitable rolling elements are placed between the actuating discs so that movement of the actuating discs relative to each other, causes the brake discs to spread apart, thereby forcing the friction linings against their respective surfaces to brake the shaft. This design has the disadvantage that the enclosed actuating rings are practically thermally isolated and have to absorb half of the braking heat. This is considerable and it can cause over heating.

To eliminate this disadvantage, a further full disco brake assembly has been proposed wherein the two rotating brake discs have friction linings only on their outwardly facing surfaces. The inwardly facing surfaces of these brakes discs are provided with raised portions, between which are mounted suitable rolling elements. One of the brake discs would be mounted for rotating movement with the shaft and the other would be rotatable relative to the shaft. By rotating one of these brake discs, relative to the other, for example, by exerting a frictional force against the outer peripheral surface of one of these brake discs, the brake discs are urged apart and the braking effect is accomplished.

However, this solution has the further disadvantage that the braking effect of the disc brake is dependent upon the self-intensification of the friction. A relatively large torque is needed to act against the disc brake to obtain the necessary braking effect. The angle of inclination of the raised portions or ramps, should be sufficient steep in order to avoid blocking. The tangent of this angle of inclination must be considerably larger than the coefficient of friction of the friction linings. For example, the angle of inclination must normally be more than 30°. In order to produce a sufficient braking power of the disc brake over the angle of inclination of the ramp, by relative twisting of one of the brake discs, nearly half of the braking moment produced by the disc brake must be spent. Consequently, the force necessary to effect braking bears a twofold rather than a linear dependence on the coefficient of friction of the friction linings.

A further problem in disc brakes of the present type concerns wear on the outer periphery of the actuating disc by engagement thereof by manually or power operated friction means to actuate the actuating disc. Such wear can shorten the working life of the actuating disc.

Another problem to which the present invention relates is retarders for trucks, buses and the like. In order to avoid excessive wear on wheel brakes of heavy trucks and buses and to make these vehicles safer, especially on highways, the vehicles normally include, in addition to the conventional compressed air operated pedal brake and the manually operated brake a "third brake" for continuous operation on the axle drive shaft or the back wheels. This is normally operated by a separate actuating lever which acts on the drive shaft of the rear axle. This brake, commonly referred to as a "retarder" as been designed as an electrical eddy-current brake or as a hydrodynamic brake. However, these known designs have the fundamental disadvantage that torque is dependent on the speed. Below a certain speed there is no braking action at all. Consequently, the presently known retarders cannot be used alone but must be considered merely as additions to a conventional wheel brake arrangement. A further disadvantage of presently known retarders is that they are relatively heavy and relatively expensive.

To solve these problems in the known retarders, a friction brake has already been suggested which, it was hoped, would be stable since liquid was used to cool the inflexible parts of the brake. However, this brake, which was relatively simple in its construction, had the disadvantage that the rotating brake discs equipped with friction linings yielded to too large an extent so that a considerable force was necessary to operate the brake. In effect, satisfactory braking was not obtained.

Thus, there exists a need for a new and improved brake which can also act as a retarder.

Another problem to which the present invention relates is the problem limiting the applicability of cylinder or disc brakes of the type built into the wheels themselves. This type of brake has suffered from the disadvantage that a considerable diminuation of speed was necessary due to the limited heat capacity of the heat absorbing metal parts. Thus, there exists a need for an improved disc brake of this type which has better heat dissipating characteristics.

SUMMARY OF THE INVENTION

Thus, it is a purpose of the present invention to provide a new and improved full disc brake assembly which overcomes the disadvantages of such assemblies as known heretofore.

In particular, it is a purpose of the present invention to provide a new and improved full disc brake assembly having rotating brake discs without self-intensification of friction, wherein the force required to effect braking bears only a linear rather than a twofold dependence on the coefficient of friction of the linings and wherein a considerably smaller torque must be applied to the actuating ring or disc to effect braking. It is a further purpose of this invention to provide a new and improved disc brake having improved heat dissipating characteristics.

According to one feature of the present invention, there is provided a disc brake assembly having a pair of brake discs fixed onto a shaft for rotational movement therewith and having friction linings formed on their external surfaces, facing away from each other. On the opposite or inner faces, the discs are provided with a plurality of raised surfaces extending circumferentially about the said inner facing surfaces. Between these discs there is mounted a symmetrical actuating disc, having formed on both of its sides raised portions which cooperate with the raised portions on the inner faces of the brake discs which the respective sides face. Rolling elements are provided between the actuating disc and each of the brake discs. The actuating disc is permitted to undergo rotating movement relative to the shaft. The discs and the elements are arranged such that by turning the actuating disc, the rolling elements ride up on the raised portions and urge the brake discs away from the actuating disc and into engagement with members which are fixed relative to the shaft, for braking the shaft.

Another feature of the present invention is an arrangement for prolonging the working life of the actuating discs and for executing the braking operation with greater precision. This is accomplished in accordance with the present invention by providing an electrically or an electromagnetically operated means for limiting movement of the actuating disc. For example, a ring equipped with a field coil for continuous current can be placed outside the periphery of the actuating disc such that when the coil is activated it produces an electric field which is closed by the external part of the actuating disc. Consequently, the actuating disc is braked in dependence upon the current through the coil. Not only does this eliminate friction on the outer periphery of the actuating disc, but also it permits a more accurate control of the braking operation since the intensity of braking is dependent upon the magnitude of the current. Alternatively, instead of a continuous current, the arrangement may also use an alternating or a triphased current.

It has been found from experience, that the angle of inclination of the raised portions on the facing surfaces of the actuating disc and the brake discs, may be as small as 4° to 5° so that a relatively small torque is required to twist the actuating disc to achieve the torque necessary to effect braking.

In one arrangement of the present invention, cylindrical block brake elements are located 180° apart about the outer cylindrical periphery of the actuating disc. These block brakes may be operated hydraulically; or alternatively a manually operated block brake may be provided.

In accordance with a further feature of the present invention, the brake discs are mounted on axially extending splines on a shaft, and a sleeve between these discs, fits over the splines. The actuating disc may be separated from the sleeve by suitable rolling elements so that the actuating disc is permitted to rotate relative to the shaft. Alternatively, a direct bearing surface can be provided between the sleeve and the shaft. Further, the friction linings can be mounted on the fixed part of the assembly rather than on the brake discs. Further spaces for coolant may be located adjacent the fixed areas of the brake assembly to provide cooling thereof.

Another feature of the present invention relates to a disc brake having improved cooling characteristics, and thus capable of being used as a retarder but wherein braking may be effected at all speeds.

This feature of the present invention is carried out by providing a new and improved liquid cooled friction brake. Preferably the linings are made from graphite powder metal or iron sinter ceramics. The durability of such linings has been found to be superior in comparison with previously known brake lining constructions.

The present invention eliminates the disadvantages of previously known retarders and provides a durable brake wherein the braking moment remains more or less the same over the whole speed range and wherein the expense and the overall weight of the brake are substantially lower than gear-friction brakes presently in use. Further, the brake of the present invention can be handled more easily since the special operating lever can be eliminated and the brake can be operated by a conventional brake pedal.

The construction of a brake according to this feature of the present invention includes housing parts which are fixed against movement in the circumferential direction and which are cooled by liquid flowing through the housing on the opposite side of the braking surfaces against which the rotating discs act. Preferably the discs are encased by this housing. In a further development of this invention, the brake discs are provided with an actuating disc located therebetween which actuating disc is movable circumferentially relative to the brake discs to actuate the same in the manner-described above.

In accordance with a further development of the invention, this space for cooling liquids is formed as a spiral on both sides of the housing, that is behind both fixed braking surfaces against which the brake discs act. This provides a better circulation of the cooling liquid for carrying off the heat derived during the braking operation. The housing can be formed in several parts, a different part being provided on each side of the cooling space. The outer part would preferably be made of light metal while the inner part forming the fixed braking surfaces would be made of a heavy material such as grey cast iron or the like.

In accordance with a further feature of the invention, the present disc brake is operated either by a pedal or by air pressure, and the brake can be tied into the conventional brake of the vehicle so that for a small braking effort (10 to 20 percent speed reduction) only the present liquid cooled disc brake is used, and beyond which the conventional brakes of the vehicle come into use. In this case, the friction surfaces of the present liquid cooled disc brake must be measured so that the actuating power transfer from the air pressure of the hydraulic equipment is adjusted to produce a braking moment which can brake continuously without overheating. In addition, the liquid cooled disc brake of the present invention may be operated manually and thus used as a parking brake. Thus, this feature of the present invention provides a brake which not only acts as a retarder, but also effects braking over the full speed range and thus stops the wheel if the brakes should fail.

In accordance with a preferred feature of the invention, the brake-cooling system could be linked up with the cooling circuit of the motor. A special pump would convey the cooling liquid through the brake. The cooling circuit of the motor is particularly useful for this purpose since during downhill driving the engine output is strongly reduced and the cooling capacity of the motor is available for use by the brake.

In accordance with another feature of the invention, the liquid cooled brake housing is combined with a special brake lever which acts upon the outer periphery of the actuating disc, the brake lever being filled with cooling fluid and in fluid communication with the liquid in the said cooling spaces within the brake housing.

A further feature of the present invention is a disc brake which can be placed into the axle of the vehicle but wherein the disc brake has a sufficiently high-heat absorbing capacity.

This feature of the present invention is carried out by placing the disc brake into the axle in a housing encircling the brake discs and having hollow spaces for cooling liquid. In addition, the axle parts coupled to the housing are formed as hollows for additional circulation of the cooling liquid. Consequently, the heat produced by the encased disc brake is absorbed by the cooling liquid and taken off through the axle parts where the large surface areas exposed to the air permit rapid and sufficient dissipation of the heat. The axle can be a normal hollow rigid axle or a crank axle with a hollow crank. Preferably a container for the liquid is fixed to an axle part and placed in fluid communication with the hollow parts of the axle through a compensation valve and a pressure relief valve.

Thus, it is an object of the present invention to provide a new and improved full disc brake assembly having brake discs mounted on the shaft for rotation therewith, which overcomes disadvantages of previous brakes of this type, as known heretofore.

It is another object of this invention to provide a brake assembly of the type described wherein the force necessary to effect braking is considerably reduced.

It is still another object of this invention to provide a new and improved brake assembly of the type described wherein an actuating disc is located between brake discs and separated therefrom by suitable rolling means, wherein axial movement of the brake disc and hence braking of the shaft, is effected by limiting rotational movement of the actuating disc relative to the brake discs.

It is another object of this invention to provide a disc brake of the type described including an electrically operated means for acting upon the actuating ring without physically contacting the same.

It is another object of this invention to provide a disc brake having improved cooling characteristics.

It is another object of this invention to provide a new and improved disc brake having improved cooling characteristics and capable of being used as a retarder as well as a brake.

It is another object of this invention to provide a new and improved disc brake capable of being used as a retarder and operable by both pneumatic and manual actuating means.

It is another object of this invention to provide a new and improved disc brake having spiral paths for cooling fluid within the fixed housing thereof.

It is another object of this invention to provide a new and improved disc brake of the type described having cooling spaces in the fixed housing thereof, wherein the cooling fluid communicates also with the interior of a brake lever used for acting upon the actuating disc.

It is still another object of this invention to provide a new and improved disc brake capable of being mounted in the axle of a vehicle and having improved heat dissipating characteristics.

Other objects and the attendant advantages of the present invention will become apparent from the detailed description to follow together with the accompanying drawings.

BRIEF DESCRIPTION OF THE DRAWINGS

There follows a detailed description to be read together with the accompanying drawings, the detailed description and the drawings intended only to illustrate preferred embodiments of the invention.

FIG. 1 is a longitudinal sectional view through a brake assembly constructed in accordance with the present invention and taken along line 1—1 of FIG. 2.

FIG. 2 is a sectional view taken along line 2—2 of FIG. 1.

FIG. 3 is a development of the sectional view taken along line 3—3 of FIG. 2.

FIG. 6 is a sectional view taken along line 6—6 of FIG. 5.

FIG. 7 is a partial sectional view taken along line 7—7 of FIG. 6.

FIG. 8 is a longitudinal sectional view similar to FIG. 5 (the bottom half thereof reversed 180°) and showing a modification of the invention, this view taken along line 8—8 of FIG. 9.

FIG. 9 is a sectional view taken along line 9—9 of FIG. 8.

FIG. 10 is a development of a sectional view taken along line 10—10 of FIG. 9.

DETAILED DESCRIPTION OF THE PREFERRED EMBODIMENTS

Figure 4:
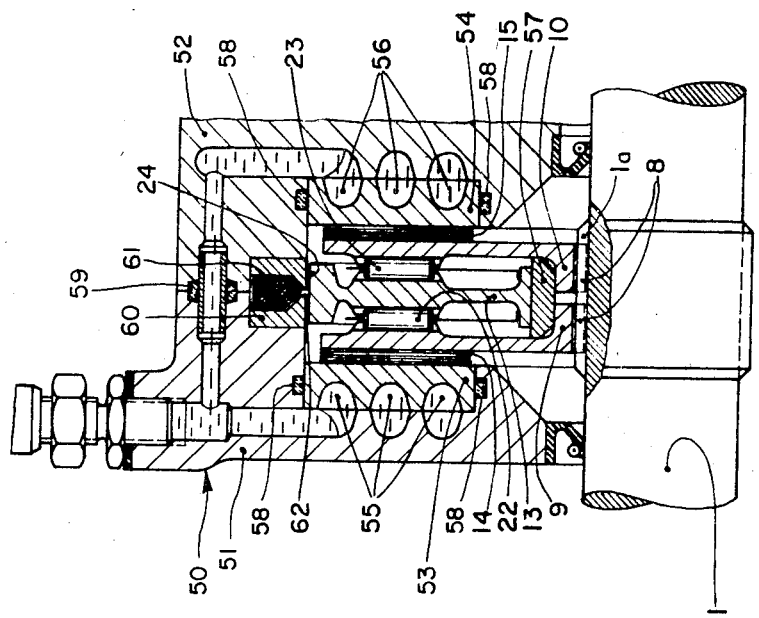
FIG. 4 is a longitudinal sectional view through the upper half of another embodiment of the present invention.

Like numerals are used to represent like elements throughout the several views.

Referring to FIGS. 1–3, a shaft 1 to be braked has a plurality of axially extending splines 1a formed thereon. This shaft extends through fixed housing portions 2 and 3, the area of the brake being sealed by suitable gaskets 6 and 7. Cooling spaces 4 and 5 are formed in the walls of the fixed housing members 2 and 3. These cooling spaces are filled with water or other cooling liquid for cooling the brake.

Brake discs 9 and 10 are mounted about the shaft 1a and include inwardly projecting teeth 8 which extend between the splines 1a on the shaft 1. Consequently, the brake discs 9 and 10 are capable of moving axially of the shaft, but are constrained to rotate with the shaft. These brakes discs are urged towards each other by means of springs 40. The brake discs 9 and 10 include friction lining surfaces 14 and 15 on the outer sides thereof, adjacent the walls of the fixed housing members 2 and 3.

An actuating disc 13 is mounted between the brake discs 9 and 10, and is supported on the shaft 1 through roller bearings 12 which engage the smooth cylindrical outer surface of a sleeve 11 which projects between the splines 1a. The actuating disc includes apertures 41 for the passage of springs 40.

The adjacent facing sides of the actuating disc 13 and the brakes discs 9 and 10, include a plurality of raised portions spaced about the shaft 1. These include raised portions 16, 18, 19, and 17, respectively, on brake disc 19, the left side of actuating disc 13 (as shown in FIG. 1), the right side of actuating disc 13 (as shown in FIG. 1) and brake disc 10, respectively. A cage 20 is located between surfaces 16 and 18, and includes rolling elements 22 therein. Cage 21 is located between surfaces 17 and 19 and includes rolling elements 23 locate therein.

Thus, it can be seen that elements 9, 10 and 13 normally rotate with the shaft 1 until rotational movement of actuating disc 13 is limited relative to the discs 9 and 10. Upon such relative movement, the rolling elements 22 and 23 roll to the raised portions and the discs 9 and 10 are urged apart against fixed housing members 2 and 3, whereby the braking effect is obtained.

To provide the said means for limiting the rotational movement of the disc 13 relative to the discs 9 and 10, the present invention may include one or more hydraulic pistons. In the present invention, a pair of hydraulic pistons $27_1$ and $27_2$ are directed against the outer cylindrical peripheral surface 24 of the actuating disc 13 and include friction lining segments 25 and 26, respectively. These pistons are actuated by means of fluid in hydraulic cylinders 28 and 29, respectively, and the said pistons include sealing collars 30 and 31, respectively.

The invention may also include a manually operated means for engaging the disc 13. Referring to FIG. 2, the manually operated means therein includes a collar 32 formed on the housing and supporting a piston 32 slidably therein, the piston having friction lining segment 35 on the inner end thereof. Inward movement of this piston is accomplished by turning the lever 33 clockwise about its pivot axis 36, as a result of which roller 37 engages and acts upon the piston 34. This arrangement may also include a sealing or dust cover 38.

FIG. 4 illustrates another embodiment of the invention. This embodiment includes a modified housing 50 having outer housing parts 51 and 52, preferably made of a light metal such as aluminum, magnesium or the like and inner housing parts 53 and 54. One side of these parts 53 and 54 adjacent the friction linings 14 and 15 is the braking surface. The opposite sides of these inner housing parts mate with the outer housing parts to form spiral cooling paths 55 and 56. Suitable gaskets 58 form fluid tight seals between the cooling spaces and the interior of the brake, and gasket 59 forms a seal between the two outer housing parts 51 and 52. This new arrangement of the hollow cooling spaces in the housing will be explained in greater detail with respect to FIGS. 5–7.

Elements in FIG. 4 identical to corresponding elements in FIG. 1 are given like reference numerals. In FIG. 4 the sleeve 11 and the rollers 12 are replaced by a bearing sleeve 57 and the portions with the teeth 8 extend inwardly beneath this sleeve 57 to support the same. Of course, a suitable means such as spring 40 and opening 41 must be provided to urge the brake discs 9 and 10 towards each other on the brake as not being actuated. However, these means are omitted from FIG. 4 and also from the remaining figures for purposes of clarity. A main feature of the embodiment of FIG. 4 is the provision of electromagnetic means for restraining the actuating discs 13 against rotation to actuate the brake. This means includes an exciting ring 60 extending circularly about the outer periphery 24 of the actuating disc 13 and spaced therefrom about the circumference of the actuating disc 13 by an airgap 62. Within the ring 60 is an electric field coil 61. When the current passes through the coil, field lines are created which are closed by the cylindrical external part of the actuating disc 13. A braking effect arises, through which the actuating disc is twisted, relative to the shaft, and the brake discs 9 and 10 are moved outwardly.

Figure 5:
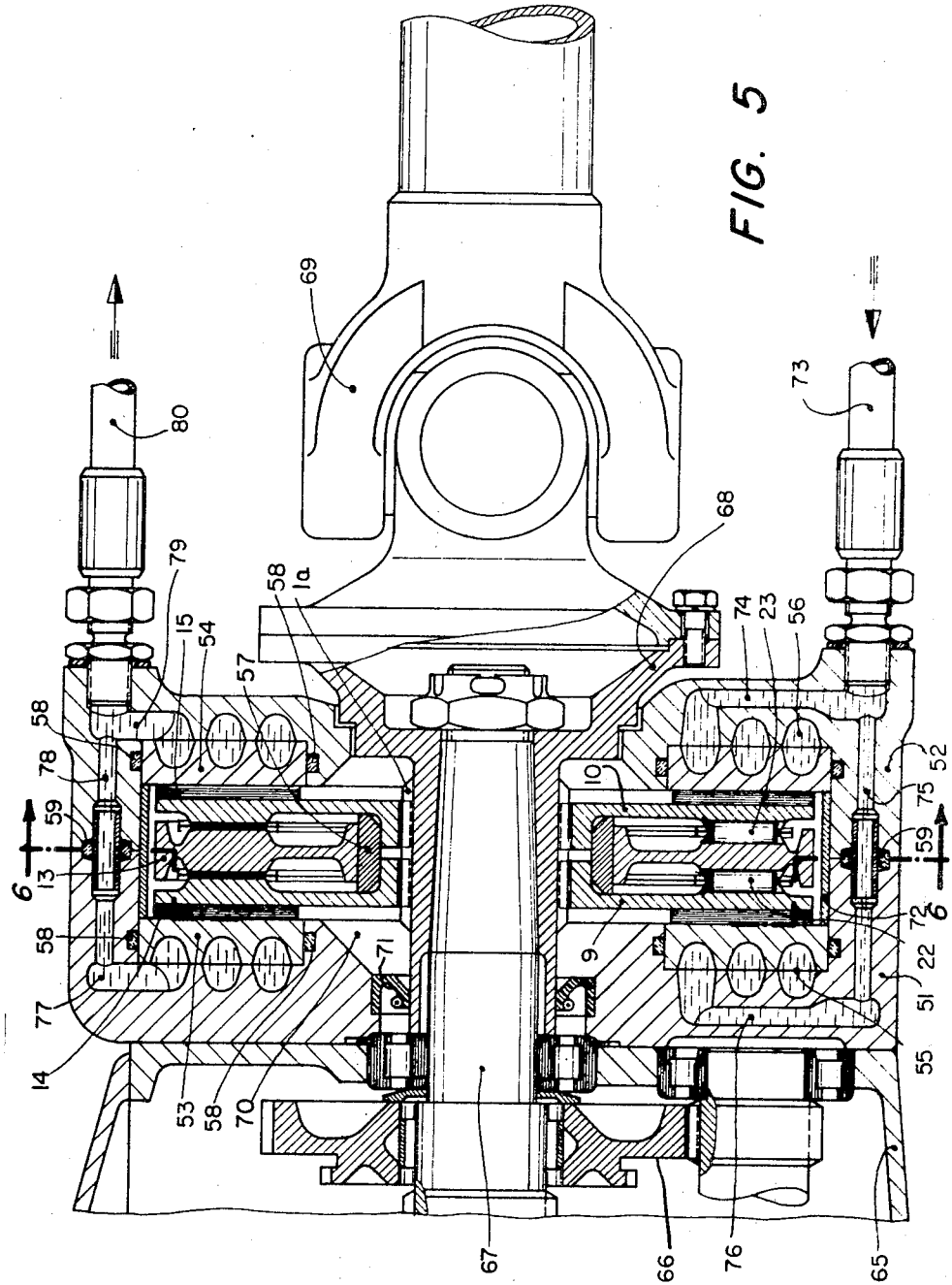
FIG. 5 is a longitudinal sectional view through another embodiment of the invention, taken along line 5—5 of FIG. 6.

FIGS. 5–7 illustrate another embodiment of the invention. This embodiment includes cooling spaces in the housing represented by elements 50–56, 58 and 59, as described with respect to FIG. 4. In the embodiment of FIGS. 5–7, a change-speed gear 65 is connected through suitable gearing 66 to a main shaft 67 which has formed thereon for rotation therewith a driven flange 68. Intermediate its ends this driven flange includes splines 1a for rotating the brake discs 9 and 10 with the shaft. At its output end the driven flange 68 is connected to a cardan shaft 69. As indicated above, like numerals represent like elements in the previous and also in the succeeding views.

The space including the braking elements is indicated as 70 and this is isolated by means of a shaft seal 71. A pressure ring 72 which extends circumferentially about the brake (see FIG. 6) provides a firm support positioning apart the inner housing parts 53 and 54.

The cooling spaces of FIG. 4 are shown in greater detail in the present embodiment. The fluid, which is preferably liquid, enters through an inlet opening 73 from which it passes through an inlet passage 74 to the spiral cooling space 56 and through connecting passage 75 to an inlet passage 76 which leads to the spiral cooling path 55. The fluid flows outwardly and then leaves the cooling space through outlet 77 and connecting passage 78 from the cooling space 55 and through outlet passage 79 from the cooling space 56, and then through the outlet passage 80.

As best illustrated in FIG. 6, the actuating disc 13 of the present invention may be acted upon by either fluid (hydraulic or pneumatic) means such as pistons 81 and 82 or by manually operated means such as pistons 83 and 84 by means of levers 85 and 86. These levers are operated in substantially the same manner as the lever 33 of FIG. 3.

In the vehicle, the cardan shaft 30 would, of course, link the change-speed gear with the rear axial of the vehicle. The fluid operated pistons 81 and 82 would be operated from the brake pedal of the vehicle while the levers 85 and 86 would be connected through suitable linkages to the handbrake lever of the vehicle.

FIGS. 8-10 illustrate a modification of the embodiment of FIGS. 5-7. Except for the modification to be explained below, FIG. 8 is identical to the lower part of FIG. 5.

In this embodiment, however, there is provided a new and improved brake lever 90 for engaging the outer periphery 24 of the actuating disc 13. This brake lever 90 is hollow and the interior thereof is in fluid communication with the coolant fluid spaces in the housing. Referring to FIGS. 8-10, the connecting passages 91 and 92 connect the spaces 74 and 76 respectively with the brake lever 90. This lever includes cylindrical extensions 93 and 94 which enter drilled apertures in the walls of the housing and communicate with openings 91 and 92, respectively. Fluid sealing is provided by gaskets 95 and 96. The brake lever 90 includes a partition 97 to assure that the liquid in the brake lever flows completely through the same. Friction linings 98 and 99 are provided on the interior of the brake lever 90.

In operation suitable means such as fluid under pressure act on the membrane 101 moving the tappet 102 downwardly to move the brake lever 90 downwardly so that the brake linings 98 and 99 engage and limit movement of the actuating disc 13. The brake lever 90 moves about an axis through the cylindrical extensions 93 and 94. When the pressure is removed, the spring 103, which is anchored at one end at the housing and anchored at another end about a protrusion connected to brake lever 90 urges the brake lever 90 away from the disc 13. The outward movement of the lever 90 may be limited by an adjusting screw 104.

Thus, in operation fluid entering the inlet 73 and passing to the inlet passage 76 will first pass through the brake lever 90, thereby providing a continuous flow of fluid through the brake lever 90.

Figure 11:
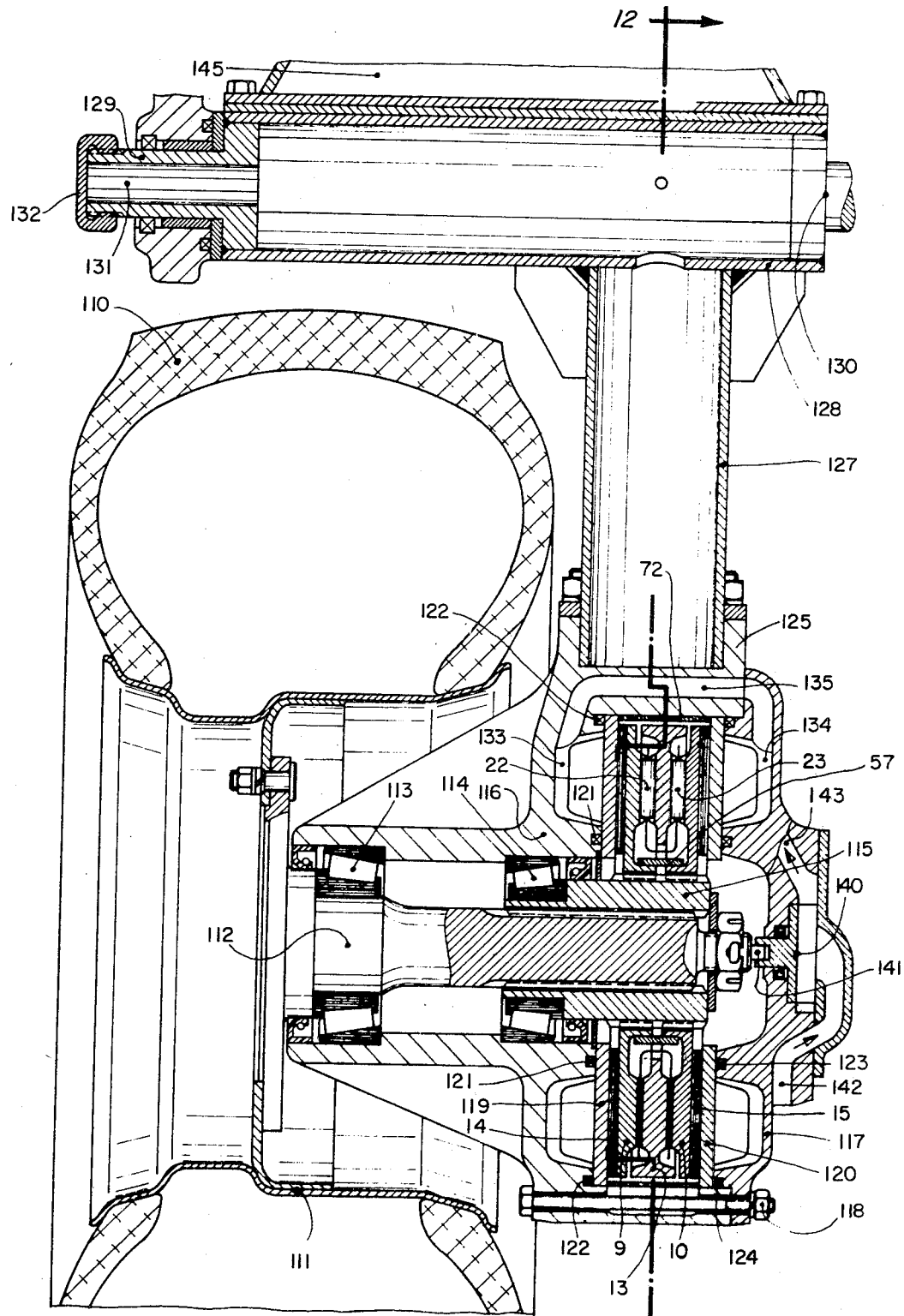
FIG. 11 is a longitudinal sectional view through another embodiment of the invention.
Figures 12, 13:
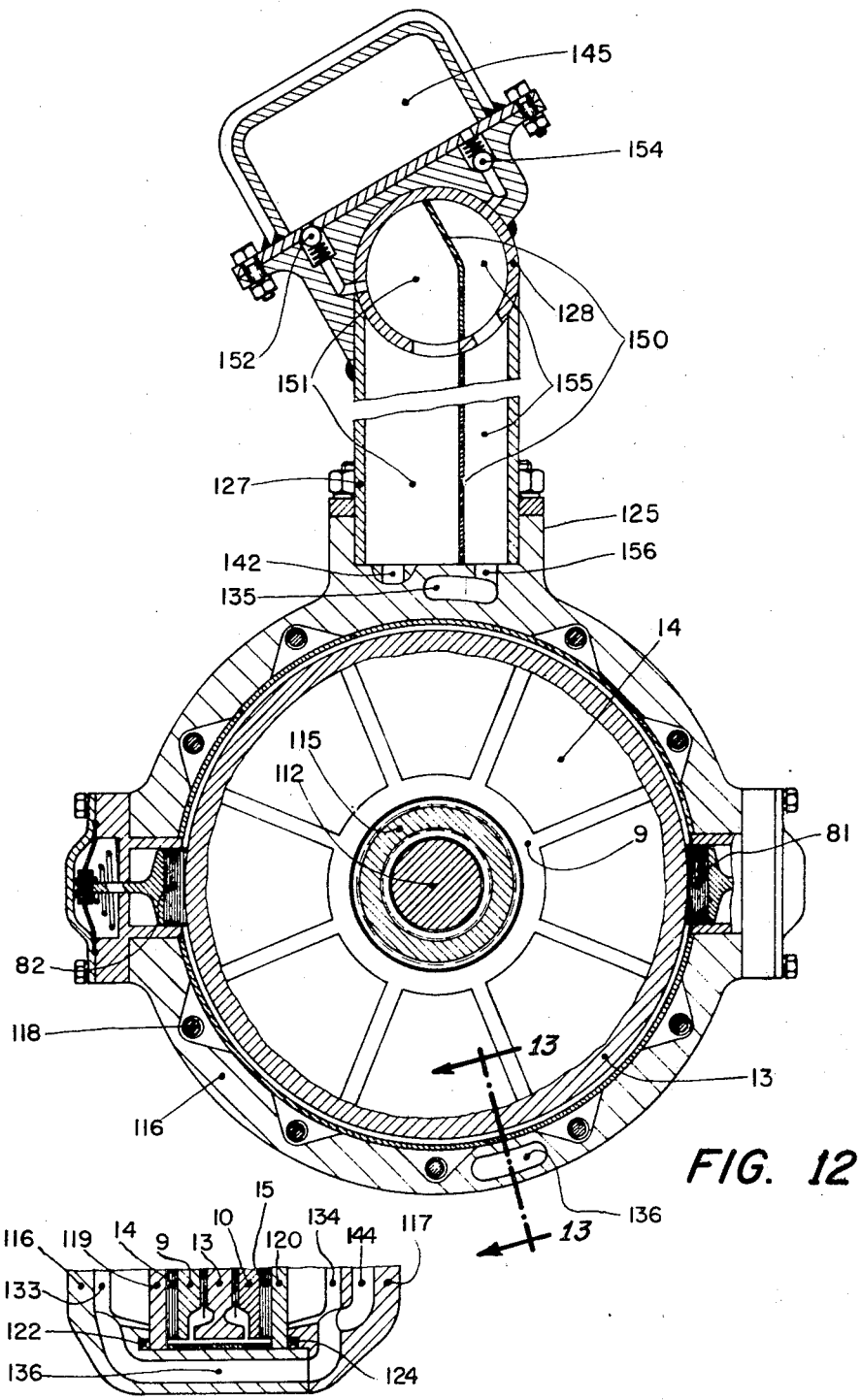
FIG. 12 is a sectional view taken along line 12—12 of FIG. 11.
FIG. 13 is a partial sectional view taken along line 13—13 of FIG. 12.

FIGS. 11-13 show another embodiment of the invention adapted to be mounted in the axle of the vehicle. The tire 110 mounted on a rim 111 is connected to the axle shaft 112. The shaft is supported by suitable roller bearings 113 and 114 and has formed thereon for rotation therewith a brake bracket 115.

In this embodiment the brake housing is similar but somewhat different than the housing in FIGS. 4-10. In this embodiment the outer housing members 116 and 117 form enlarged cooling spaces 133 and 134 respectively, which spaces are bounded by an inner fixed housing members 119 and 120, the inner sides of which form braking surfaces which are frictionally engaged by friction linings 14 and 15 attached to brake discs 9 and 10. The housing members 116 and 117 are held together by suitable bolts 118. The cooling spaces are sealed by suitable gaskets 121, 122, 123 and 124. The housing includes a flange portion 125 which rigidly supports the crank axle carrying tube 127 which is in turn welded at its upper end to the crank axle bearing tube 128. The crank axle bearing tube 128 has two cylindrical extensions 129 and 130. The extension 129 includes a passage 131 therethrough for fluid, this passage being covered by a cap 132.

Referring to FIG. 12, the crank axle carrying tube 127 is divided in two parts by a partition 150, and a coolant reservoir container 145 is mounted above the tube 128. Referring to FIG. 12, addition cooling fluid passes from container 145 through the one way compensation valve 152 to the inlet chamber 151 and then through the passage 142 which leads through the housing and becomes the inlet chamber to the pump 140. This pump then directs the coolant fluid through pump outlet passage 143 to the coolant space 134 and through pump outlet passage 144 through the lower connecting passage 136 (see FIGS. 12 and 13) to the other coolant space 133. Meanwhile, the two spaces 133 and 134 are also in fluid communication with each other through upper connecting passage 135. If the pressure of the fluid becomes too great, the fluid can be released from passage 135 through opening 156 (see FIG. 12) to the outlet chamber 155 and then through the one way pressure relief valve 154 to the coolant reservoir container 145.

As in the previous embodiments, pistons 81 and 82 which may be operated by any suitable means such as pneumatic or hydraulic fluid engage the outer periphery of the actuating disc 13 to limit the rotation thereof so that the discs 9 and 10 move outwardly to actuate the brake.

Circulation of the cooling fluid may also be provided by a pump placed in the container 145 and driven by a thermostat controlled motor. In this manner, continuous circulation is provided and the fluid is passed through the large tubes 127 and 128 from which heat may be readily dissipated.

Although the invention has been described in considerable detail with respect to a preferred embodiment thereof, it will be apparent that the invention is capable of numerous modifications and variations apparent to those skilled in the art without departing from the spirit and scope of the invention.

I claim:

1. A disc brake assembly comprising a housing, a shaft rotationally mounted in said housing, a pair of brake discs mounted on said shaft for rotation therewith and for linear movement parallel to the axis of the shaft friction surfaces on the outer sides of said brake discs which face away from the other disc, a braking surface fixed with respect to said housing being located adjacent said friction surfaces such that when the discs are moved away from each other they frictionally engage said fixed braking surfaces to brake the shaft, an actuating disc mounted between said brake discs and having opposite radial surfaces, each of which face an inner side of a brake disc and form therewith a set of facing sides, each said set of facing surfaces including raised portions on at least one side of the set, and rolling elements between the sides of the set, such that when the actuating disc is rotated relative to the brake discs, the rolling elements engage the said raised portions to urge the brake discs away from the actuating disc and against the said fixed braking surfaces to brake the shaft, and including actuating means for acting upon the actuating disc to limit rotational movement thereof relative to the brake discs, said shaft including a plurality of splines extending substantially parallel to the shaft axis, said brake discs including inwardly projecting teeth engaging between said splines.

2. A brake disc assembly according to claim 1 including a sleeve nonrotatably engaging and surrounding the spline between the brake discs and having a cylindrical outer surface, the said actuating disc mounted by rolling means, by means of which said actuating disc is rotatable relative to the shaft.